Figure 1:
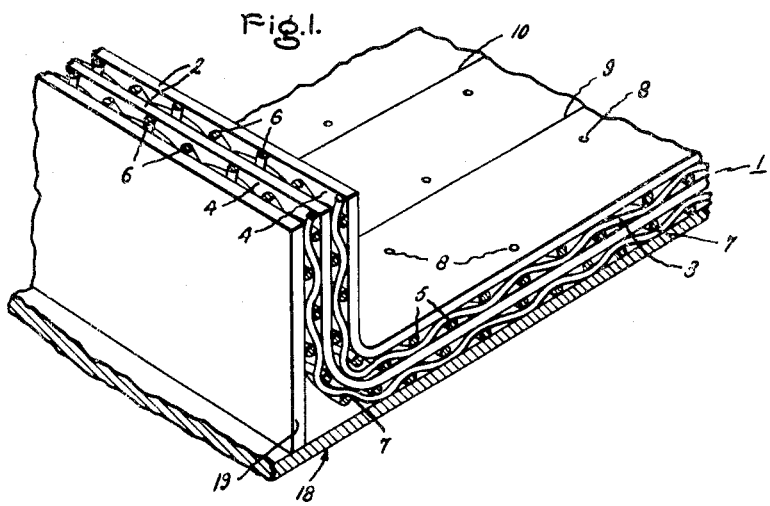

Oct. 19, 1965   R. G. RHUDY   3,212,864

THERMAL INSULATION

Filed April 11, 1960

Inventor:
Ralph G. Rhudy,
by Paul A. Frank
His Attorney.

United States Patent Office 3,212,864
Patented Oct. 19, 1965

3,212,864
THERMAL INSULATION
Ralph G. Rhudy, Scotia, N.Y., assignor to General Electric Company, a corporation of New York
Filed Apr. 11, 1960, Ser. No. 21,566
2 Claims. (Cl. 29—183)

The invention described herein is a continuation-in-part of applicant's prior application Serial No. 739,960, filed May 28, 1958, now matured into U.S. Patent No. 2,985,106 that, in turn, is a continuation of applicant's prior application Serial No. 346,713, filed April 3, 1953, for Thermal Insulation System, now abandoned.

My invention relates to insulation and more particularly to thermal insulation adapted for use in both relatively high and low temperature environments.

In the transfer of very hot liquids, such as liquid sodium, from one place to another through pipes or tubes, it is desirable to provide thermal insulation surrounding those pipes to prevent the loss of heat, and further, it may be essential to insulate the pipe to prevent damage to equipment adjacent thereto. In installations where the space factor is important or where uniformity of thickness of thin layers of insulation is required, materials ordinarily used for high temperature applications are unsatisfactory. Ceramic insulation materials are fragile and are susceptible to breakage when exposed to expansion, shock, and vibration incident to such use. Asbestos is subject to crumbling with the resultant deterioration in its insulating capabilities; and rock wool can be used only where other structure is available to keep it from being compressed. Further, it is frequently necessary, as in the case of electromagnetic liquid metal pumps, to provide an insulation of high uniformity in thickness in the region between the duct containing the liquid metal and the magnetic elements used in providing power for moving the liquid metal through the duct.

My invention contemplates insulation which offers a solution to these problems and which is easy to manufacture and install.

Accordingly, an object of my invention is to eliminate the disadvantage of the prior art by providing an inexpensive and simply designed insulating material adapted for use in installations operating throughout a wide temperature range.

Also, it is an object of my invention to provide insulation capable of serving the dual function of an insulation and as a stable mechanical spacing element.

Another object of my invention is to provide a thermal insulation made entirely of metal.

Briefly stated, in accordance with one aspect of my invention, I provide a basic layer of insulating material formed of a thin sheet of metal having reflecting surfaces of low thermal emissivity, and a spacing member formed from a metal cloth of high thermal resistivity. The thermal insulation is formed by using the desired number of these basic layers to provide the desired thermal resistance. For use in electromagnetic fields, the metal sheets may be cut in strips to restrict transverse eddy currents.

Figure 2:
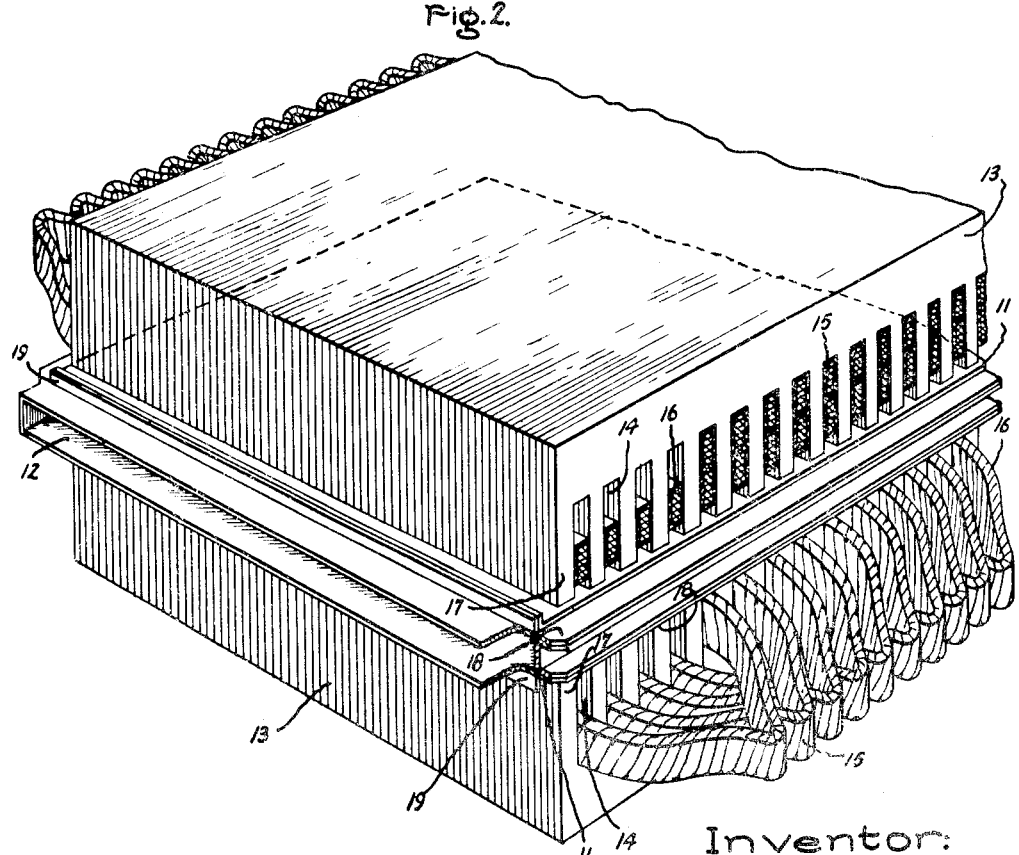

While the specification concludes with claims particularly pointing out and distinctly claiming the subject matter which I regard as my invention, it is believed the invention will be better understood from the following description taken in connection with the accompanying drawing in which:

FIGURE 1 is a fragmentary perspective view illustrating one form of my invention; and FIGURE 2 is a fragmentary perspective view illustrating one embodiment of my invention as applied to an electromagnetic liquid metal pump.

Referring now to the drawing wherein like reference characters designate like or corresponding parts throughout the several views, there is shown in FIGURE 1, thermal insulation capable of withstanding high compressive forces while still retaining its initial uniform thickness. The insulation is especially useful in high temperature environments for furnishing a constant space factor while performing an insulating function in a localized area, such as the duct of an electromagnetic pump shown in FIGURE 2. An shown in FIGURE 1, the insulation comprises means to serve as a heat radiation barrier in the form of a thin sheet 2 and means to serve as a spacing member in the form of a cloth, screen or mesh 3. Cloth 3 of the insulation is adapted to be positioned in contact with a wall having heat at a high temperature on its opposite side, such as the wall 18 used in forming part of duct 12 adapted to carry liquid sodium in an electromagnetic pump. Normally, the sheet material 2 of the insulation comprises the outer insulating layer, although in some cases, the position of the mesh or screen may be reversed if desired. Single layers of screen and sheet are illustrated in FIGURE 1 but it will be evident that a plurality may be used if desired, depending on the degree of insulation needed and the other demands of a particular installation.

Referring more specifically to the individual components of the insulation, the sheet 2 may be of any desired thickness and formed from any material; however, in the practice of my invention I find that sheet metals having thicknesses in the order of 0.010″ when used as heat radiation barriers, produce an insulation of minimum thickness and yet retain the necessary rigidity for fabrication purposes and provide the insulation with necessary physical strength. It is further desirable to fabricate sheets 2 from a metal having surfaces 4 of low thermal emissivity. This property will ordinarily be found in metals having bright surfaces which will serve as reflectors, and while any such metal can be used, I prefer to use alloys of iron containing chromium and possibly nickel. Such alloys of iron are commonly called stainless steels and are known for their resistance to surface oxidation and discoloration in high temperature use. Obviously, other metals having low thermal emissivity characteristics may be used.

The cloth or mesh 3 located next to the high temperature surface, as of duct 18, or between adjacent layers of sheet material 2, is formed by a plurality of transverse strands 5 interwoven with a plurality of longitudinal strands 6. Strands 5 and 6 are preferably not integrally connected at their junction points 7 and the mesh is held together by its physical configuration. While strands 5 and 6 may be of any material capable of withstanding the temperatures to be encountered in use, which in the case of liquid sodium may be as high as approximately 900° C., it is desirable to use strands formed of metal, and specifically stainless steels, because of their relatively high thermal resistivities and their resistance to deformation in the presence of mechanical load and vibration. Both the sheet 2 and cloth 3 may be made of materials having high thermal resistivities, that is, those materials having resistivity values of $$\frac{0.2° \text{ C. inch}}{\text{Watt}}$$

or greater at room temperature. The sheet 2 further should have a surface displaying low thermal emissivity characteristics, that is, the emissivity values should be no greater than 0.5 at room temperature.

Referring again to FIGURE 1, the metal cloth 3 is in contact with the metal sheet 2 at a plurality of points overlying each junction 7 of the cloth 3. Since it is desirable to provide the maximum resistance to the transfer of heat from the metal sheet 2 to the metal cloth 3, the strands 5 and 6 should be of minimum size to reduce the area of contact between the metal cloth 3 and the metal sheet 1. The mesh of the cloth (i.e., the number of openings in the cloth per linear inch) should be at the minimum consistent with the development of adequate strength. Additionally, it may be desirable to deliberately oxidize the wire cloth, so that these points of contact will offer more resistance to the flow of heat between the sheet 1 and the cloth 3. Means for securing metal cloth 3 to sheet 1 may be provided if desired, as for example spot welds 8. Welds 8 should be placed at irregular points to prevent the existence of a path of high thermal conductivity which will occur if the weld 8 of adjacent insulating layers are in overlying relationship. It will be noted that transverse strands 5 and longitudinal strands 6 of cloth 3 serve to divide the volume occupied by the cloth 3 into a plurality of small cells which serve to reduce the amount of heat transferred by convection across the space occupied by metal cloth 3.

In other words, the capabilities of my thermal insulation are derived from using sheets of material having surfaces of low thermal emissivity and steel cloth or screen of high thermal resistivity. The cloth serves as a heat radiation barrier by permitting minimum surface contact with the adjacent metal sheets by utilizing a material having maximum resistance to the transfer of heat by conduction, and by providing a spacing member capable of restricting the flow of air between adjacent sheets which reduces the transfer of heat by convection.

As an illustration of the thermal insulating properties of the insulation of this invention, the thermal resistivity for two insulation layers, each formed of 0.010" stainless steel sheets and 18 mesh stainless steel metal cloth formed of wires of 0.010" diameter to produce a total thickness of insulation of 0.060", measured $$\frac{550° \text{ C. in.}}{\text{Watt}}$$

as compared to $$\frac{\text{Watt}}{1010° \text{ C. in.}}$$

for rock wool insulation.

Because it is made entirely of metal, the thermal insulation disclosed herein is extremely resistant to shock and vibration. It possesses great physical strength in compression because of the mechanical construction wherein the cloth 3 supports the sheet 2 at a plurality of closely spaced points. It is apparent that if the maximum value of resistivity is not desired, other metals having different resistivities such as aluminum or copper $$\frac{0.1 ° \text{ C. inch}}{\text{Watt}}$$

may be used. A particular benefit derived from using this insulation is that the rate of heat dissipation from a product can be controlled through its use. With the insulation applied to a heated vessel, air can be passed in heat exchange relationship with it in controlled amounts to vary the temperature of the vessel. Nevertheless, when no air is circulated past the vessel, the insulation displays excellent thermal insulation characteristics since the resistivity would be very high. When air under high velocity for example is blown against the vessel, low thermal resistivity results, the reason being that the steel cloth or screen imparts turbulence to the air and permits it to flow over a greater surface area and thereby conducts away a greater amount of heat by convection. Variation in air velocity permits variation in the thermal insulation characteristics over a wide range. It will be apparent to those skilled in the art that the size of wires in the insulation and the mesh of the cloth or screen may be varied to suit individual applications to obtain a greater or lesser amount of heat dissipation.

The above description of my insulation comprising elements assembled to form a system can be used in any organization requiring insulation having the attributes described above. I have discovered that a new combination of elements is made possible by using it with an electromagnetic pump structure, not only for protecting the electrical components but also for supporting the heavy magnetic cores necessary for pump operation. The construction of such a pump is disclosed in my copending application Serial No. 739,960, filed May 28, 1958, now Patent No. 2,985,106.

As disclosed in that application, a liquid, such as liquid sodium, is pumped through the flat rectangular duct or conduit 12. Thermal insulation systems 11, similar to the one shown in FIGURE 1, are positioned immediately above and below duct 12 to insulate the magnetic stators 13 therefrom. The thermal insulation positioned below duct 12 serves as the supporting structure without the aid of other mechanical structure.

Windings 15 are positioned in slots 14 disposed in the stator cores and, upon energization, produce a traveling magnetic field which moves or pumps liquid metal through the duct, as fully described in said patent. Windings 15 are covered with ground insulation 16 in the usual manner. The insulation 16 alone cannot withstand the high temperatures of a liquid metal flowing through the duct 12 without otherwise being heavily insulated therefrom. Additionally, the magnetic permeability of the stators 13 is reduced by increased temperature. Tests conducted on a pump including the invention described herein, show that the transfer of heat from the duct 12 through the insulation system 11 to the stators 13 and insulation 16 is not sufficient to damage or otherwise impair the operation of the pump despite the fact that the teeth 17 of stators 13 were in direct contact with the thermal insulation components. Additionally, because of the uniformity of thickness of insulation systems 11, the thickness of the insulation may be reduced to a minimum with the result that the number of ampere turns required of the coils 15 is likewise reduced to a minimum.

It is preferable, in this case, to use metal sheets 2 made of a non-magnetic material, as for example stainless steel, AISI type 302. It is further desirable if the sheets 2 are slotted as indicated at 9 and 10 in FIGURE 1 to reduce the transverse eddy currents in sheets 2. Further, to reduce transverse eddy currents in cloth 3, welds 8, if used, are placed at preselected points so that a minimum number are located on any transverse or longitudinal strand.

From the foregoing, it is readily apparent that my invention provides insulation adaptable for use in a high temperature environment and which will serve as a mechanical spacer without the aid of additional support. It is likewise readily apparent that this thermal insulation is durable, easy to manufacture, and is adapted for use in a varying magnetic field.

While I have illustrated and described a particular embodiment of my invention, further modifications and improvements thereof will occur to those skilled in the art. It is to be understood, therefore, that the invention is not limited to the specific embodiment shown, and I intend in the appended claims to cover all modifications thereof which do not depart from the spirit and scope of the invention.

What I claim as new and desire to secure by Letters Patent of the United States is:

1. Metallic insulation adapted for impeding transfer of heat from one body to another at a lower temperature while simultaneously being capable of carrying the maximum load presented by either one of said bodies comprising a plurality of layers of insulation in contact with the walls of said bodies, each said layer comprising a plurality of interwoven longitudinal and transverse metal strands of high thermal resistivity capable of withstanding loads in compression exerted by said bodies, each of said strands having floating ends, and a metal sheet of high thermal resistivity and low surface emissivity separating said strands in each layer but placed in contact with spaced points thereon for forming a plurality of cells effective in impeding the transfer of heat between said bodies, said metal strands and said sheet in each layer being placed in overlapping relationship to provide independent movement therebetween when subjected to the expansive forces created by heat between adjacent layers thereby permitting differential expansion of said layers.

2. Thermal insulation for impeding transfer of heat from a heat radiating body comprising a cloth of interwoven longitudinal and transverse strands of high thermal resistivity having floating ends and positioned in contact with the heat radiating surfaces of said body, and a plate of material of low surface emissivity placed over and in contact with said strands to form a plurality of cells between said body and said plate effective in preventing the circulation of air currents by convection, the resistivity of said strands and plate of material being $$\frac{0.2° \text{ C. inch}}{\text{watt}}$$

or greater at room temperature, said strands and said plate respectively limiting the transmission of heat from said body by conduction and radiation because of their respective high thermal resistivity and low thermal emissivity characteristics.

References Cited by the Examiner
UNITED STATES PATENTS

| | | | |
|---|---|---|---|
| 290,831 | 12/83 | Allen | 154—44 |
| 844,380 | 2/07 | Marwick. | |
| 1,243,654 | 10/17 | Clark. | |
| 1,896,286 | 2/33 | Burns. | |
| 1,899,080 | 2/33 | Dalgliesh. | |
| 2,028,670 | 1/36 | Hosking | 154—53 |
| 2,180,373 | 11/39 | Sibley | 189—34 |
| 2,335,836 | 11/43 | Zimmerman | 189—34 |
| 2,389,238 | 11/45 | Phillips | 189—34 |
| 2,814,717 | 11/57 | Hardesty | 189—34 |
| 2,911,038 | 11/59 | Frommett | 154—53 |

DAVID L. RECK, *Primary Examiner.*

WHITMORE A. WILTZ, HYLAND BIZOT, *Examiners.*